Figure 1:
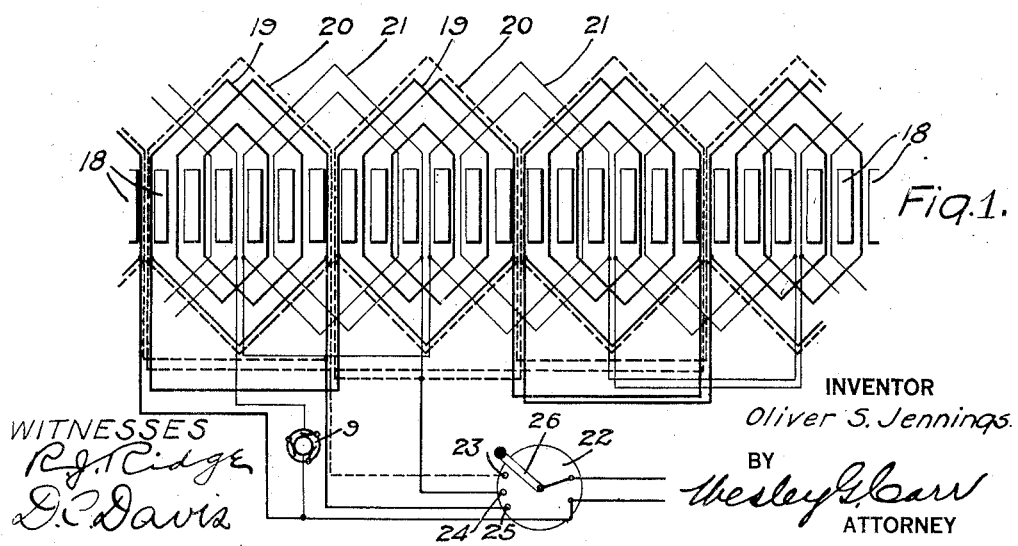

O. S. JENNINGS.
INDUCTION MOTOR.
APPLICATION FILED JUNE 30, 1915.

1,280,040.

Patented Sept. 24, 1918.
2 SHEETS—SHEET 1.

WITNESSES
R. J. Tidge
D. C. Davis

INVENTOR
Oliver S. Jennings.
BY
Wesley G. Carr
ATTORNEY

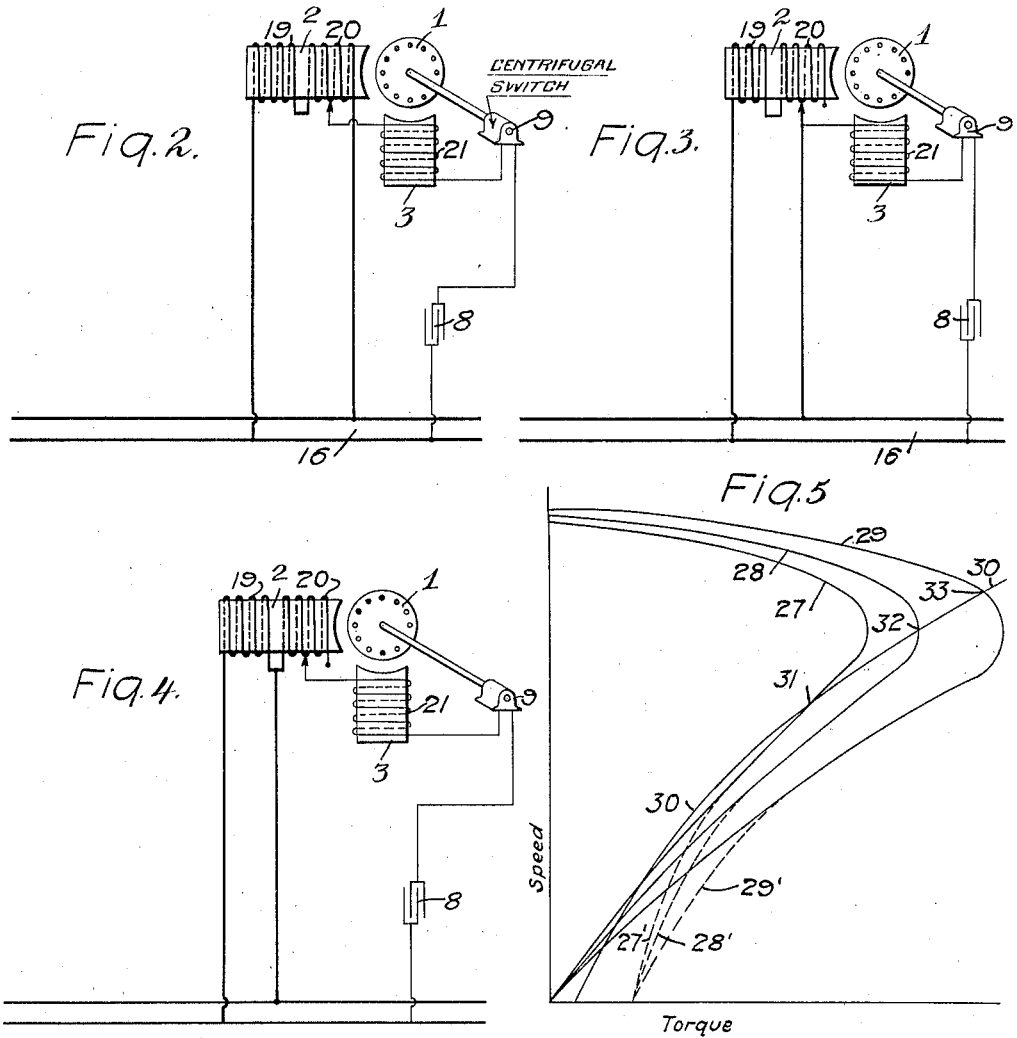

UNITED STATES PATENT OFFICE.

OLIVER S. JENNINGS, OF WILKINSBURG, PENNSYLVANIA, ASSIGNOR TO WESTINGHOUSE ELECTRIC AND MANUFACTURING COMPANY, A CORPORATION OF PENNSYLVANIA.

INDUCTION-MOTOR.

1,280,040.  Specification of Letters Patent.  Patented Sept. 24, 1918.

Application filed June 30, 1915. Serial No. 37,253.

*To all whom it may concern:*

Be it known that I, OLIVER S. JENNINGS, a citizen of the United States, and a resident of Wilkinsburg, in the county of Allegheny and State of Pennsylvania, have invented a new and useful Improvement in Induction-Motors, of which the following is a specification.

My invention relates to induction motors, and it has for its object to provide means whereby the speed of machines of the character specified may be varied in a simple and economical manner, with but few lead wires, and it has special reference to the speed control of small motors, particularly of the single-phase type, such, for example, as those employed in driving fans and other domestic appliances.

In the accompanying drawings, Figure 1 is a developed diagrammatic view of the winding of the primary member of an induction motor, with its attendant control and supply circuits, constructed in accordance with the preferred form of my invention; Figs. 2, 3 and 4 are simplified diagrammatic forms illustrating the connections of the winding shown in Fig. 1 during different speeds; Fig. 5 is a diagram illustrating the speed-torque characteristics of a motor constructed in accordance with my invention when employed with a load having a torque increasing with the speed; and Fig. 6 is a chart illustrating the sequence of the pole changes in the circuit of Fig. 1, as modified for different speeds.

It is a well known fact that a change in the strength of the primary field of an induction motor alters the speed-torque characteristics of said motor, increases in the strength of the field increasing the speed for a given torque and vice versa when operating in the portions of the curve usually employed. When operating, therefore, upon a load the torque of which increases with the speed, such, for example, as a fan, an increase in the strength of the main field may be effected by proper design to cause an increase in the running speed of the fan.

When an inductive device, such, for example, as a choke coil or the primary winding of an induction motor, is connected to a source of alternating current having a definite voltage, there is established an alternating flux through the winding of said inductive device having such a phase relation as to induce a back electromotive force in said winding of nearly the same value as the impressed electromotive value. If now, the number of turns in said inductive winding is reduced, it is obvious that the flux linked with the remaining turns must be increased in order to generate the same back electromotive force. The somewhat anomalous result occurs, therefore, that an increase in the number of turns in an inductive winding decreases the flux interlinked with said winding and vice versa.

I make use of the above-described phenomenon to adjust the speed of a single-phase induction motor in a simple and effective manner, entirely dispensing with external choke coils, auto-transformers or other types of starting apparatus commonly employed hitherto. Briefly stated, my invention comprises varying the strength of the field produced by the primary winding by varying the number of effective turns in said winding, and, in order to reduce the number of leads from the control switch to the motor to a minimum, a portion of the turns in the primary winding are, at times, in series with the starting winding usually employed in connection with single-phase motors while assisting the remainder of the main field winding, and, at other times, a portion of the main field winding is in series with the starting winding and opposes the remainder of the main field winding up to the point where the starting winding cut-out switch operates. The main field flux then produced is that desired for motor operation.

Referring to Fig. 2 of the accompanying drawings for a more detailed understanding of my invention, the secondary member of an induction motor is shown at 1 and is preferably a rotor of the squirrel-cage type. The main field portion of the primary member is indicated at 2 and is provided with a main field winding 19 and an auxiliary winding 20. An auxiliary portion of the primary member is shown at 3 and is arranged to be energized by a split-phase winding 21 for starting purposes. A phase-displacing device for the starting circuit is shown at 8 and a switching device, operative, for example, by centrifugal force, is shown at 9 for opening the starting circuit when sufficient speed is attained by the rotor 1.

Referring to Fig. 1 for an understanding of a preferred form of my invention, I have shown at 18—18 the teeth of a primary core member of the usual slotted type between which are arranged the main field winding 19—19, the auxiliary main field winding 20—20 and the starting winding 21—21. A control switch 22 is provided having contact members 23, 24 and 25 adapted to be respectively connected in circuit by means of a movable arm 26 of the usual type. When the switch arm 26 is moved to make contact with the member 23, the windings are connected as shown in Fig. 2, the two main field windings 19 and 20 being connected in series with each other across the supply mains 16, and the starting winding 21 being connected from the mid-point of the winding 20 to the main which is in connection with the outer terminal of the winding 19. Under these conditions, the poles will be as indicated for the low-speed condition in Fig. 6, the main and auxiliary field windings assisting each other throughout and the starting winding is inserted. When the switch arm 26 in Fig. 1 is moved to make contact with the member 24, the medium speed connections are established, as shown in Fig. 3. One-half the auxiliary main field winding 20 is eliminated from the circuit and the remaining half assists the main field winding 18, thus producing a smaller number of effective turns in the main field exciting winding and a resultant increase in the strength of the main field, increasing the speed of the motor. As shown in connection with medium speed in Fig. 6, two of the poles of the auxiliary main field winding which would be for the instant north, are eliminated from the circuit. For the high-speed connections, current is supplied to the two terminals of the main field winding 19 and flows through one-half of the auxiliary main field winding 20, in the reverse direction with respect to the winding 19 that has hitherto been taken, until such time as the cut-out switch 9 operates. In consequence of the neutralizing action thus produced, the number of effective turns in the main field winding is reduced even more than is necessary but not to such a degree as to interfere with the desired operation. If it be desired to eliminate said neutralizing action, an additional lead to convey the current to the starting winding may be employed. As indicated for high speed in Fig. 6, two poles of the auxiliary main field winding are eliminated and the remaining two poles are at all times opposed to the coaxial poles of the main field winding 19 during starting.

In all cases where starting current flows in the auxiliary main field winding, the automatic cutout switch 9 should be employed but, if, by the use of a separate lead to the starting winding, the flow of starting current in the auxiliary main field winding is not necessary, the starting winding may be left in circuit throughout motor operation, thus obviating the cutout switch. I have shown by circumscribing circles in Fig. 6 those poles which are deënergized upon the operation of the centrifugal switch.

Referring now to Fig. 5 for a further understanding of the device, I have plotted the speed-torque curves 27, 28 and 29 corresponding, respectively, to the primary field strengths employed for low, medium and high speeds, torque being plotted on the axis of abscissæ and speed being plotted on the axis of ordinates. The curves 27, 28 and 29 converge to the zero point at zero speed in a single-phase motor because of the total absence of starting torque, I therefore indicate by the dotted lines 27', 28' and 29' the shape which the curves 27, 28 and 29 assume because of the action of the split-phase starting winding. A curve illustrating the rate at which the opposing torque of a fan increases with the speed is shown at 30 and the intersection of the curve 30 with the curves 27, 28 and 29 determines the three running positions indicated at 31, 32 and 33.

My invention is illustrated as applied to the speed control of a single-phase, self-starting motor, but it may equally well be applied to polyphase motors.

I have shown my invention in its preferred forms, but it will be apparent to those skilled in the art that it is susceptible of various minor changes and modifications without departing from the spirit thereof and I desire, therefore, that only such restrictions shall be placed thereupon as are imposed by the prior art or are specifically set forth in the appended claims.

I claim as my invention:

1. The combination with a single-phase motor embodying principal and auxiliary series-connected main field windings, and a starting field winding, of a three-speed control switch in one supply main thereof, a connection from the low-speed contact member to one terminal of said auxiliary field winding, a connection from the medium-speed contact member to an intermediate point in said auxiliary field winding and to a terminal of said starting winding, a connection from the high-speed contact member to a terminal of said principal field winding and to the remaining terminal of said auxiliary field winding, and a connection from the remaining terminals of said principal and starting field windings to the other supply main, whereby said motor may be operated at three different speeds with but four lead wires from the control switch to said motor.

2. The combination with a single-phase motor embodying principal and auxiliary series-connected main field windings and a starting winding connected to an intermediate point of said auxiliary winding, of means for connecting all or a portion of said auxiliary winding so that it assists said principal winding in its magnetic effect or for connecting a portion of said auxiliary winding in series relation with said starting winding so that it opposes said principal winding, whereby speed control of said motor may be effected.

In testimony whereof, I have hereunto subscribed my name this 26th day of June, 1915.

OLIVER S. JENNINGS.